United States Patent [19]

Kazenas

[11] 3,915,884
[45] Oct. 28, 1975

[54] MODIFIED AMIDES FOR PIGMENTS AND METHOD FOR PRODUCING THE SAME

[75] Inventor: Zenon Kazenas, Euclid, Ohio

[73] Assignee: Day-Glo Color Corporation, Cleveland, Ohio

[22] Filed: Jan. 15, 1974

[21] Appl. No.: 433,506

Related U.S. Application Data

[63] Continuation-in-part of Ser. No. 253,960, May 17, 1972, abandoned, which is a continuation-in-part of Ser. No. 103,854, Jan. 4, 1971, abandoned.

[52] U.S. Cl. 252/301.2 R; 106/288 Q; 252/301.3 R; 260/37 N; 260/78 R; 260/78 SC
[51] Int. Cl.² .......................... C09K 1/02
[58] Field of Search .......... 260/78 R, 78 SC, 37 N; 252/301.2 R, 301.3 R; 106/288 Q

[56] References Cited
UNITED STATES PATENTS

| | | | |
|---|---|---|---|
| 2,174,527 | 10/1939 | Peterson | 260/78 R |
| 2,938,873 | 5/1960 | Kazenas | 252/301.2 R |
| 3,475,387 | 10/1969 | Carter et al. | 260/78 R |
| 3,498,955 | 3/1970 | Morgan et al. | 260/78 R |
| 3,699,074 | 10/1972 | Lubowitz et al. | 260/37 N |

Primary Examiner—Arthur P. Demers
Attorney, Agent, or Firm—McNenny, Farrington, Pearne & Gordon

[57] ABSTRACT

A polyfunctional amine is reacted with both a polycarboxylic acid and a monocarboxylic acid to form relatively short chain polyamides in the molecular weight range from about 400 to about 2500, which are substantially linear and which have at least one carboxy group remaining on the majority of molecules, which permits a thermoplastic resin to be formed which is extremely friable and grindable, at the same time making it a durable and desirable matrix for incorporating dyes, particularly fluorescent dyes, to form a pigment characterized by exceptionally high heat stability. Light stability is also improved with some fluorescent dyes. Optionally, an epoxy resin may be included in the co-condensate, maintaining at least one carboxy group on most molecules of the co-condensate, without altering the thermoplastic nature of the resin. Alternatively, the monocarboxylic acid may be omitted, forming a modified polyamide with a polyfunctional amine and a polycarboxylic acid. Optionally, whether or not a monocarboxylic acid is used, a sufficient amount of stabilizing compound of an element from Groups IIA and IIB may be added to further stabilize the pigment.

12 Claims, No Drawings

MODIFIED AMIDES FOR PIGMENTS AND METHOD FOR PRODUCING THE SAME

RELATED APPLICATIONS

This is a continuation-in-part of copending application Ser. No. 253,960 filed May 17, 1972, now abandoned, which was in turn a continuation-in-part application of Serial No. 103,854 filed Jan. 4, 1971, now abandoned.

BACKGROUND OF THE INVENTION AND PRIOR ART

The instant invention relates to pigments among which are those for improved fluorescent compositions in which fluroescent agents are carried in suitable thermoplastic synthetic resinous carriers, and, more particularly, fluorescent coating compositions in which organic fluorescent dyes are incorporated in a modified carbamide carrier.

U.s. Pat. Nos. 2,653,109; 2,809,954; 2,938,873; 3,198,741; and 3,412,036 disclose various fluorescent compositions made from thermoplastic resinous materials which incorporate dyes for coating compositions and the methods for preparing them. These references disclose pigments which are unstable at elevated temperatures, particularly above about 350° F., for more than a short time. This instability to heat forces the use of relatively low temperatures in extrusion or molding equipment and requires that the pigments be exposed to elevated temperatures for a minimum time only. It is a primary achievement of the instant composition to have overcome this major weakness of the prior art compositions.

These references also point out that fluorescent compositions for fluorescent displays, and particularly organic fluorescent coatings on surfaces of articles exposed to sunlight and weathering conditions, exhibit a rapid depreciation in fluorescence when subjected to the destructive influence of actinic radiations and reactive gases and vapors normally present in the atmosphere. The provision of organic fluorescent compositions which would posses sufficient heat stability with respect to color retention at molding temperatures and "light-fastness" especially to destructive actinic radiation, to render the compositions commerically acceptable, solves an ever-present problem to which an improved soluton is constantly sought. Some of the instant organic fluorescent compositions exhibit fluorescence after repeated molding of recycle material and prolonged exposure to actinic radiation and weathering conditions superior to any prior art compositions.

The term "organic fluorscent dyes" as employed in this specification includes soluble fluorescent dyestuffs, fluorescent intermediates, and like fluorescent organics, which are brilliantly fluroescent in solution or when homogeneously dispersed in vehicles such as resins and gums, but which are particularly fugitive and unstable when molded repeatedly or under normal eterior weathering conditions.

U.S. Pat. No. 3,198,741 discloses the shortcomings of prior art compositions including thermosetting resins and particular thermosplastic resins and the difficulty of obtaining a thermoplastic resin which has the necessary characteristics of friability and light stability. In view of these prior art disclosures, it was totally unexpected and very surprising to find that the pigments of the instant invention which are modified polyamides are extremely friable and highly grindable. Friability and grindability are properties which are conspicuous by their absence in conventional, linear polyamides. it is difficult to account fully for the unexpected heat and light stability and relative permanence of the instant pigments; but it is known that light stability with some fluorescent dyes is imparted to the resin by the presence of at least one reactive carboxy group on relatively short chain length, substantially linear polyamides and it is theorized that heat stability may be enhanced.

The instant pigments are useful in coating compositions of all types ranging form inks to paints, and in moldable resins which are to be formed into uniformly colored, shaped articles. Where a resin is to be injection molded, such as in the injection molding of polyolefines and linear polyamides, it was discovered that is some instances, the resin-dye combination when molded at temperatures above 450° F., exhibited a darkening of the color or loss of brightness of the pigment. It is hypothesized that the color degradation might be due to metal contamination from the barrel and screw of the molding machine. The instant modified polyamides containing at least one free carboxy group can be modified so that the resin-dye combination is much less sensitive to such supposed metal contamination.

SUMMARY OF THE INVENTION

It has been discovered that a thermoplastic resin may be prepared which is a condensation product of a polyfunctional amine and a polycarboxylic acid together with a monocarboxylic acid in which a coloring material such as a dye may be dispersed or dissolved to the extent of from 0.01% to 35% by weight, to form a pigment or pigment concentrate.

The monocarboxylic acid may be formed in situ by providing a cycloalkyl primary monoamine and a dicarboxylic acid in sufficient quantity to form the desired monocarboxylic co-condensate to function as a terminator and control the molecular weight of the resin formed.

The pigment may be formed by incorporating the coloring material in the co-condensation product prior to or during formation of the product. Alternatively, the resin particles may first be formed by grinding the uncolored, solid resin mass and the particles may then be dyed by immersion in a dye bath. In any event, the final pigment particles are formed by the easy grinding of a resin mass, usually substantially nonporous, as distinguished, for example, from merely breaking up agglomerates of fine particles produced by precipitation of the resin from a liquid solution, or the difficult grinding of a thermosetting resin which has been cured in the solid state. The resins of the instant invention when ground resist subsequent agglomeration before, during and after dispersion in most film-forming vehicles. In addition, they have low oil absorption characteristics and, with the proper choice of particle size together with their relatively low density, are therefore less prone to settling out.

In addition to the above three components, a co-condensation product may be formed by including, additionally, a sufficient amount of a straight chain polymeric molecule containing at least one oxirane ring per molecule, such as the diglycidyl ether of bisphenol A (and its homologues), glycidyl ethers of glycerol, glycidyl ethers of bisphenol F, glycidyl ethers of tetrakis (hydroxy phenyl) ethane, and epoxylated novolacs. However, the inclusion of an epoxy resin as a co-condensate is effected in such a manner as to maintain at least one carboxy group on most of the co-condensate molecules.

Further, it has been discovered that a friable, substantially nonporous, thermoplastic resin may be prepared which is a condensation product of a polyfunctional amine and a polycarboxylic acid which may include a coloring material or a dye to form a pigment.

It has also been discovered that the instant modified, relatively low molecular weight, substantially linear polyamides, containing at least one free carboxy group on the majority of co-condensate molecules, may be de-sensitized relative to the contaminative effect of metals in contact with it by including a sufficient amount of a stabilizing compound of an element selected from Group IIA or IIB.

Alicyclic secondary diamines may be substituted for the polyfunctional aliphatic or alicyclic primary amines. An aromatic-substituted aliphatic primary monoamine or an alicyclic secondary monoamine may be used as a terminator in the place of the monocarboxylic acid, and the substitutions may be made independently.

PREFERRED EMBODIMENT OF THE INSTANT INVENTION

The instant invention consists of a modified polyamide made from a co-condensation product of: (a) a polyfunctional primary amine, preferably a difunctional amine: (b) a monocarboxylic aromatic acid, preferably benzoic acid or a substituted carboxy benzene; (c) a polycarboxylic aromatic acid, preferably a dicarboxylic aromatic acid with carboxy groups on noncontiguous carbon atoms; and optionally (d) an epoxy resin which will not destroy the thermoplastic characteristics of the co-condensation product, preferably one based on bisphenol A, such that at least one carboxy group remains on the majority of the molecules of the co-condensate. More particularly, the instant invention consists of a pigment made from the modified polyamide described immediately hereinabove and a coloring material, preferably one which is compatible with the instant modified polyamide and preferably one which is characterized by an ability to fluoresce in the presence of ultraviolet or blue-green light. The instant invention thus contemplates the preparation of a co-condensate of (a) (b) (c) or (a) (b) (c) and (d), which may include a coloring material, and particularly a daylight fluorescent dye. The ratio of $a:b:c$ may vary widely provided at least one carboxy group remains on the majority of the molecules of the condensate, and the average molecular weight is not substantially in excess of 2500. The molar ratio of $a:b:c$ ranges from about 10.1: 10 to about 1:1:1; most preferred are ratios of $a:b:c$ from about 4:1:4 to about 1:1:1. Preferred molar ratios of $a:b:c:d$ range from about 3:3:4:1 to about 1:13:17:6.

In another embodiment the instant invention consists of a co-condensation product of : (a) a polyfunctional primary amine, preferably a difunctional amine; (c) a polycarboxylic aromatic acid, preferably a dicarboxylic aromatic acid with carboxy group on noncontiguous atoms, chosen in such a ratio as to provide at least one carboxy group remaining on the majority of the molecules of the co-condensate. A coloring material of fluorescent dye may be added to the co-condensate to form a pigment. The ratio of $a:c$ may vary widely provided at least one carboxy group remains on the majority of the molecules of the co-condensate and the average molecular weight is not substantially in excess of 2500. The molar ratio of $a:c$ is always greater than 1:1 but not greater than 1:2.

Although most polyfunctional primary amines will form resinous products when used in the ratios described hereinabove, those which form the most friable resins are the alicyclic polyfunctional primary amines. Most preferred is isophorone diamine. In general, higher molecular weight resins are more difficult to grind, so it may be desirable to limit molecular weight particularly for pigments in molding resins where dispersion characteristics as a function of particle size is important. Usable resins may be formed with xylylenediamine and trimethyl-hexamethylene diamine which is an aliphatic branched diamine normally available as equal parts of two isomers 2,2,4- and 2,4,4-trimethyl hexamethylenediamine. Resins formed with the aliphatic branched diamines will be found to be relatively low melting and not as desirable where high temperature stability is essential. Though the low melting resins are difficultly grindable under ambient temperature conditions, they are extremely friable and easily grindable at low temperatures such as are obtained in a dry-ice-jacketed grinder. These resins might be useful in inks where a pigment is not essential.

The formation of the monocarboxylic compound in situ is provided by the condensation reaction product of an alkyl primary monoamine selected from cycloalkyl primary monoamines, hetero cyclic secondary monoamines, and benzylamine with an equimolar amount of a dicarboxylic acid selected from isophthalic acid, terephthalic acid, dicarboxy naphthalene, and aliphatic dicarboxylic acids having less than 10 carbon atoms serially linked in a chain.

Where a monocarboxylic acid is to be formed in situ, it is preferably formed as the reaction product of a cycloalkyl primary monoamine and an aromatic dicarboxylic acid such as isophthalic acid, an aralkyl carboxylic acid or an aliphatic dicarboxylic acid. Preferred aliphatic dicarboxylic acids are those having less than about 10 carbon atom directly linked in the chain, and more preferably, less than about 7 carbon atoms serially linked in a straight chain. Preferred aliphatic dicarboxylic acids are adipic acid, glutaric acid, maleic acid, and succinic acid. Unexpectedly, a co-condensate of a cycloalkyl primary monoamine and a dicarboxylic acid which forms, in situ, a monocarboxylic co-condensate, reduces the problem of loss of the monocarboxylic compound through fumes, as occurs where benzoic acid is used. Overcoming the problem of fumes permits the carrying out of the reaction in an open kettle where progress of the reaction can be visually monitored. In addition, reduction of the fumes results in better yields of product with a more precise distribution of resin in the desired molecular weight. Moreover, from a purely economic view, it is often possible to form, in situ, the desired monocarboxylic co-condensate more economically than directly charging the reaction kettle with a readily available aromatic monocarboxylic acid such as benzoic acid.

Alternatively, the instant modified polyamide consists of the co-condensation product (a) a polyfunctional primary amine, preferably a difunctional amine, (b) an aromatic-substituted aliphatic primary monoamine, preferably benzylamine, (c) a polycarboxylic aromatic acid, preferably a dicarboxylic aromatic acid with carboxy groups on noncontiguous atoms, and optionally (d) an epoxy resin which will not destroy the thermoplastic characteristics of the co-condensation product, preferably one based on bisphenol A, such that at least one carboxy remains on the majority of the molecules of the co-condensate. A simple ratio which yields a heat-stable, modified polyamide is a co-condensate of $a:b:c$ in the ratio of 1:1:2. Other ratios, such as 2:1:3, 3:1:4, etc., may be used until the molecular weight approaches 2500.

It will be apparent from the molar ratio set forth above that the monocarboxylic aromatic acid or the aromatic-substituted aliphatic primary monoamine is used simply as a chain terminator in sufficient quantity so as to ensure the molecular weight range of the co-condensate molecule to be in a predetermined range from about 400 to about 2500, while the polycarboxylic acid with the carboxy groups on noncontiguous carbon atoms is used to provide at least one free carboxy group on the majority of the co-condensate molecules. Phthalic acid preferably in combination with another acid, e.g. isophthalic, is a polycarboxylic acid mixture which may be used, but overall properties of the final pigment are not as good.

Where an epoxy resin is used, a polyfunctional primary amine is not used directly, but as the reaction product of a polycarboxylic acid with a polyfunctional amine, said amine having a functionality which is at least one less than the aggregate functionality of the carboxylic acid moieties in the molecule so that there is at least one carboxylic moiety left over; the molar ratio of said reaction product corresponds to the number of hydroxy groups formed by the condensation of the epoxy resin with the polybasic acid and the chain terminator; thus, where benzoic acid is used as a chain terminator, a co-condensate formed with one mol of benzoic acid (B), six oxide mols of a bisphenol A based resin such as Epon 828 (E), and three mols of isophthalic acid (I), believed to be represented as B-E-I-E-I-E-I, there will be six free hydroxyl groups formed, requiring six mols of carboxy amide represented by the reaction product of one mol each of benzoic acid, isophoronediamine and isophthalic acid.

In addition to the components set forth hereinabove, a stabilizer may be used which does not act primarily as a filler but as a color stabilizing component in the co-condensate product in such a way as to coact with the carboxy groups, and more particularly, a sufficient amount of said stabilizer is incorporated to coact with at least 30 percent of the aggregate number of free carboxy groups present. Thus, if one of two modified polyamide co-condensates consists of equimolar quantities of benzoic acid (B), a primary diamine, such as isophorone diamine (N), and dicarboxylic acid, such as isophthalic acid (I), and the other modified polyamide consists of two mols of a dicarboxylic acid per mol of a primary diamine, then a one-molar quantity of a stabilizer such as magnesium oxide would be used so as to coact with about two-thirds of the free carboxy groups present in the mixture, forming a modified polyamide believed to be represented thus: B-N-I-Mg-I-N-I. Preferred stabilizers are compounds of elements in Group IIA and Group IIB of the periodic table which are compatible with the co-condensate and the coloring material and which can furnish the Group II element in a form capable of stabilizing the co-condensate molecule and for the coloring material used. It appears that certain stabilizers such as the oxides and carbonates react with available carboxy groups. Thus, when oxides and carbonates of Group II elements are used, it is preferred to add an amount sufficient to react with at least 30 percent of the aggregate number of free carboxy groups in the resin. Other stabilizers, such as the organic acid salts of the Group II elements may coact in a different manner, either with the co-condensate or the coloring material, or both. Salts of the saturated and unsaturated carboxylic acids having less than 25 carbon atoms are preferred; most preferred are the calcium, magnesium, zinc and cadmium salts of the saturated fatty acids having from 9 to 18 carbon atoms, such as magnesium pelargonate, calcium and zinc stearates. The mechanism by which carboxylic acid salts of Group II elements stabilize the pigments in which the instant co-condensates are used, is not known; however, it is hypothesized that the divalent Group II elements coact either with the co-condensate or the dyestuffs or both, by sharing electrons in a manner which imparts the necessary stability.

Unexpectedly, Group II element-stabilized co-condensates form pigments which may be utilized in polyolefin molding compositions, polyvinyl chloride molding compounds as well as in vinyl plastisols with equal facility, are more stable at much higher temperatures than prior art pigments. They present the same brightness at the same time being more stable at much higher temperatures. It is well known that pigments in polyvinylchloride goods exhibit a substantial degree of bleed particularly at higher temperatures. Unexpectedly, the use of Group II element in the co-condensate compounds provides a bonding of the pigments which permits no discernible bleed under clamping at elevated temperatures.

In some instances, e.g. with blues, it may be found desirable to include inert opacifiers such as $TiO_2$ or Zns in an amount up to 20% by weight of the pigmentary material. These materials are utilized in their usual pigmentary form, e.g. —325 mesh.

Preferred amines are polyfunctional primary amines which are alicyclic, such as 1-amino-3-aminomethyl-3,5,5-trimethyl cyclohexane, commonly known as isophorone diamine and aliphatic amines having an aromatic ring, such as the meta and para-xylylene diamines. Preferred aliphatic polyfunctional primary amines are primary diamines such as ethylene diamine, diethylene triamine, triethylene dimethylamino propylamine, diethylamine propylamine, trimethylhexamethylene diamine and the like.

Preferred monocarboxylic aromatic acids are benzoic acid and substituted benzoic acids such as p-toluic, o-toluic, and 4-methoxy benzoic acids.

Preferred aromatic polycarboxylic acids are those which have carboxy groups on noncontiguous carbon atoms, such as isophthalic acid, terephthalic acid, trimesic acid, and dicarboxy and tricarboxy naphthalene. It will be seen from this disclosure that where a tricarboxylic acid is used, a polyamine might be used in conjunction therewith provided the molar proportions are chosen in such a manner as to provide the desired carboxy functionality in the co-condensate product.

Although in some respects the properties of the co-condensates formed when a polyfunctional secondary amine is substituted for the polyfunctional primary amine are less desirable, they form friable resins which have good color and which enhance the fluorescence of the dyes incorporated therein. Co-condensates formed from alicyclic polyfunctional secondary amines, preferably a difunctional amine, display especially good color characteristics. Most preferred is 1,3-di-4-piperidylpropane. Useful co-condensates of (f) a polyfunctional secondary amine, (b) a monocarboxylic aromatic acid, preferably benzoic acid or a substituted carboxy benzene, and (c) a polycarboxylic aromatic acid, preferably a dicarboxylic acid with carboxy groups on noncontiguous carbon atoms, are formed in the range of molar ratios from about 10:1:10 to about 1:1:1. Preferred ratios of *f:b:c* range from 4:1:4 to 1:1:1.

The polyfunctional secondary amine may be used with a substituted aliphatic primary amine, such as benzylamine, as a chain terminator in sufficient quantity so as to ensure the molecular weight of the co-condensate to be in a predetermined range from about 400 to about 2500.

Alternatively, the instant modified polyamine consists of (f) a polyfunctional secondary amine, (g) a heterocyclic secondary monoamine, preferably a substituted heterocyclic secondary amine such as 4-phenyl propylpiperidine and (c) a polycarboxylic aromatic acid, described hereinabove. A simple ratio which yields a stable modified polyamide is a co-condensate of *f:g:c* in the ratio 1:1:2. Other ratios such as 2:1:3, 3:1:4, etc., may be used until the molecular weight approaches 2500. The polyfunctional primary amine (a) described hereinabove may be substituted for (f) the polyfunctional secondary amine and the heterocyclic secondary monoamine used for the terminator in a sufficient quantity so as to ensure the molecular weight of the co-condensate to be in a predetermined range about 400 to about 2500.

To the co-condensates mentioned hereinabove, dyes, stabilizers, catalysts, absorbers, opacifiers, and compatible lubricants, such as stearic acid and the like, may be added prior to, during, or after the reaction is completed.

EXAMPLE 1

Equimolar quantites of benzoic acid (B), isophorone diamine (N) and isophthalic acid (I) are reacted in a reaction vessel vented to the atmosphere. The reaction vessel is equipped with heat exchange means, preferably a hot fluid, which may be replaced by a relatively cool fluid to control reaction temperature if and when an exothermic reaction requires cooling of the reaction mass. While the reaction mass is a molten fluid, a coloring material, such as Rhodamine B Ex[1,] is added thereto in an amount approximately 1% by weight of the reaction mass. After the reaction is apparently complete, by maintaining a temperature in the range from about 250° C to about 275° C, as evidenced by the subsiding of bubbles due to the evolution of water, the reaction product is dumped, whereupon it quickly solidifes into a nonporous friable resin mass. The pigment, when ground into a powder in a size range from about 0.25 to about 25 microns in diameter, is incorporated into a molding grade low density polyethylene in an amount approximating 1–2% by weight. The molded article made therefrom in a reciprocating screw injection molding exhibits uniformly distributed nondegraded color at melt temperatures up to and including 540° F, which is not possible with the compositions of U.S. Pat. No. 2,938,873. The finely divided powder when dispersed in a paint exhibits superior weathering to the compositions of the above-identified U.S. Pat.

[1]Abbreviation for EXTRA

EXAMPLE 2

A modified polyamide is formed by the co-condensation of 1 mol of benzoic acid (B), 2 mols of isophorone diamine (N), and 3 mols of isophthalic acid (I) by staging the addition of isophthalic acid (I) and isophorone diamine (N) in such a manner as to give a mixture of co-condensates believed to be represented by B-N-I- and I-N-I. In other words, approximately one-half of the mols of isophorone diamine (N) are condensed with benzoic acid (B) and isophthalic acid (I) and the other one-half of the mols are condensed with 2 mols of isophthalic acid (I). Immediately before the mixture is dumped, a fluorescent dye Brilliant Sulpho Flavine[1] in an amount approximately about 1% by weight of the resin mass is homogeneously mixed into the co-condensate. The pigment is included in moldable polyolefin resins in which it is homogeneously dispersed, and exhibits superior heat resistance qualities compared with the pigments disclosed in U.S. Pat. No. 2,938,873.

[1]manufactured by GAF Chemicals

EXAMPLE 3

To the liquid resin mass of Example 2 prior to being dumped in added 1 mol of magnesium oxide and the reaction mass is stirred until the reaction appears to be completed. The pigment is cooled and ground and incorporated into a low density molding grade polyethylene powder in an amount approximately 1–2% by weight of the powder. The articles molded are uniformly colored, and are approximately the same color despite a holding period of 10 minutes in the barrel of a reciprocating screw injection molding machine at a temperature of 540° F.

EXAMPLE 4

A modified polyamide is formed by the co-condensation of one mol of benzoic acid (B), 2 mols of isophorone diamine (N) and two mols if isophthalic acid (I) in a reaction vessel vented to the atmosphere under conditions similar to those in Example 1 hereinabove. The product formed is believed to be represented by B-N-I-N-I.

EXAMPLE 5

Three mols of isophorone diamine (N), 1 mol of benzoic acid (B) and 3 mols of isophthalic acid (I) are reacted under similar conditions as in Example 4 immediately hereinabove. The product so formed is believed to be represented by B-N-I-N-I-N-I.

EXAMPLE 6

Four mols of isophorone diamine (N), 1 mol of benzoic acid (B) and 4 mols of isophthalic acid (I) are reacted under similar conditions as in Example 1 hereinabove. The product so formed is believed to be represented by B-N-I-N-I-N-I-N-I.

EXAMPLE 7

Two mols of isophorone diamine (N), 2 mols of benzoic acid (B) and 1 mol of trimesic acid (T) are reacted under conditions similar to Example 1 hereinabove. The product so formed is believed to be represented by

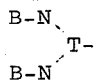

EXAMPLE 8

Three mols of isophorone diamine (N), 2 mols of benzoic acid (B) and 2 mols of trimesic acid (T) are reacted under conditions similar to Example 1 hereinabove. The product so formed is believed to be represented by

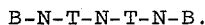

EXAMPLE 9

Three mols of isophorone diamine (N), 2 mols of benzoic acid (B), 1 mol of trimesic acid (T) and 1 mol of isophthalic acid (I) are reacted under conditions similar to Example 1 hereinabove. The co-condensation product so formed is believed to be represented by

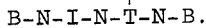

EXAMPLE 10

Four mols of isophorone diamine (N), 3 mols of benzoic acid (B) and 2 mols of trimesic acid (T) are reacted under similar conditions to Example 1 hereinabove. The co-condensation product so formed is believed to be represented by

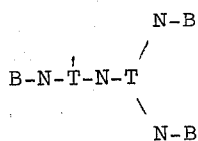

EXAMPLE 11

Equimolar quantities of benzoic acid (B), isophorone diamine (N) and isophthalic acid (I) are reacted with a ¼ molar quantity of magnesium carbonate to form a co-condensation product believed to be represented by B-N-I-Mg-I-N-B mixed with a minor portion of a product believed to be B-N-I. A yellow or green fluroescent dye in an amount approximately about 1% by weight of the resin mass is homogeneously mixed into the molten mass which is subsequently cooled and ground. The pigments are included in moldable polyolefin resins as before.

EXAMPLE 12

A magnesium co-condensate product believed to be represented by B-N-I-Mg-I-N-I- is formed as in Example 11 hereinabove by substituting 1 mol of isophthalic acid (I) for 1 mol of benzoic acid (B) in one branch of the magnesium containing co-condensation product. It is mixed with 1 mol of a co-condensation product believed to be represented by B-N-I, melted, solidified and ground as before.

EXAMPLE 13

Molar quantities of benzoic acid (B), isophorone diamine (N) and isophthalic acid (I) are reacted as in Example 1 hereinabove. While the reaction mass is a molten fluid, 0.2 mols of finely divided zinc oxide is homogeneously dispersed therein. Also added is about 1% by weight of Rhodamine 6 GDN Ex[1.] The reaction product is dumped, whereupon it quickly solidifies into a nonporous friable resin mass. A Rhodamine B Ex[1] may be substituted for the Rhodamine 6 GDN Ex₁ used herein.

[1]Abbreviation for EXTRA

EXAMPLE 14

The co-condensate of Example 13 is again formed by reacting isophorone diamine, benzoic acid, and isophthalic acid, as described hereinabove, and subsequently adding the zinc oxide in the molar ratios specified therein. Rhodamine B Ex is added in an amount of about 1% by weight of the molten reaction mass, and homogeneously dispersed therein. The reaction mass is then dumped, whereupon it solidifies into a nonporous friable resin mass with a brilliant red color. The heat stability of the pigment, with respect to color retention in a thermoplastic synthetic resin in which it is dispersed for injection molding, is superior to the heat stability with respect to color retention of the same pigment excluding the zinc oxide, both at prolonged holding in the barrel of the machine and upon repeated recycling of scrap resin.

EXAMPLE 15

Equimolar quantities of benzoic acid, 1,3-di-4-piperydyl propane and isophthalic acid are reacted in a reaction vessel, as in Example 1 hereinabove. While the reaction mass is a molten fluid, a coloring material such as Rhodamine B Ex is added thereto in an amount approximating less than 1% by weight of the reaction mass. After the reaction is apparently complete, the reaction product believed to be represented by B-N-I is dumped, whereupon it quickly solidifies into a nonporous friable resinous mass.

EXAMPLE 16

One mol of 4-phenyl propylpiperidine, 1 mol of 1,3-di-4-piperydyl propane and 2 mols of isophthalic acid are reacted as in Example 15. To the molten reaction mass is added 0.2 mols of finely divided zinc oxide which is homogeneously dispersed therein. After the reaction is apparently complete, the reaction product is dumped, whereupon it quickly solidifies into a nonporous friable resinous mass.

EXAMPLE 17

20 parts of water are added to 68.12 parts isophorone diamine (0.4 mols) and 132.9 parts isophthalic acid (0.8 mols) at 55° C continuous stirring on an oil bath. The exotherm raises the temperature to 115° C and forms a heavy paste which begins to solidify on heating to 125°C. The stirring is stopped. The temperature is raised to 195° C where the block of the amine salt begins to melt. One drop of phosphorus acid is added and the temperature is raised gradually to about 258° C and held for about 10 minutes. The melt is cooled at 235° C and 1.39 parts of Rhodamine B Ex are added and stirred in until dissolved. The reaction mass is viscous at 225° C, but can be stirred. It is dumped and cooled, whereupon it quickly solidifies into a nonporous, friable, resinous mass.

EXAMPLE 18

A small quantity (8 grams) of water is added to 68.12 grams (0.4 mols) of isophorone diamine and 99.68 grams (0.60 mols) of isophthalic acid and heated with stirring. The mixture solidifies at 170° C but melts at about 210° C to 220° C when stirring is discontinued. The reaction mass is heated to 262° C and then cooled to 238° C before 1.37 grams of Rhodamine B Ex is dissolved in the molten mass. 8.06 grams (0.20 mols) of finely divided magnesium oxide is stirred into the mass and then dumped, whereupon it quickly solidifies into a brightly colored, nonporous, friable, resinous mass.

EXAMPLE 19

3 mols of isophorone diamine and 4 mols of isophthalic acid, along with a small quantity of water, were reacted as in Example 17 hereinabove. A clear, nonporous and friable resinous mass is formed when the hot resinous mass is dumped and cooled. The resinous mass may be colored as desired by addition of a coloring material such as a dye.

EXAMPLE 20

Equimolar quantities of benzoic acid, isophorone diamine, and isophthalic acid are reacted in a reaction vessel, as in Example 1 hereinabove. While the reaction mass is a molten fluid, a coloring material such as Rhodamine B Ex is added thereto in an amount approximating 1% by weight of the reaction mass. After the reaction is apparently complete, about 10% by weight of zinc stearate is added to the reaction mass and homogeneously mixed therein. The molten reaction mass is dumped and forms a nonporous, friable, resinous mass. In addition to the zinc stearate, it may be desirable to include additional quantities of the oxides and/or carbonates of zinc, magnesium, calcium, or barium.

In all of the preceding examples hereinabove, dyes may be included at any stage, depending upon the compatibility of the dye with the components and the heat-sensitivity of the dye.

EXAMPLE 21

Unit molar quantities of benzoic acid (B), isophorone diamine (N), 0.8 mol of isophthalic acid (I), and 0.2 mols adipic acid (A), 0.2 mols of zinc oxide and a mol of water are reacted in a reaction vessel vented to the atmosphere. The function of the water is to maintain the reaction mass in a relatively fluid form and to facilitate a reaction. As in previous examples, the reaction vessel is equipped with heat exchange means, preferably a hot fluid which may be replaced by a relatively cool fluid to control reaction temperature if the exothermic reaction requires cooling of the reaction mass. The ratio of components in the reaction product is B:N:I:A:Zn = 1:1:0.8:0.2:0.2.

While the reaction mass is a molten fluid, coloring materials are added such as Rhodamine EX and Rhodamine 6GDNX along with about 5% by weight of stearic acid and 10% by weight of an ethylenevinyl acetate copolymer such as Ultrathene. It is preferred that adipic acid and isophthalic acid be added to the reaction mass when the reaction mass reaches a temperature of about 210° C. After the reaction is apparently complete, at a temperature in the range from about 250° C to about 275° C, as evidenced by the subsiding of bubbles due to the evolution of water of reaction, the reaction product is dumped, whereupon it quickly solidifies into a nonporous friable resin mass.

Yields in excess of 90% of theoretical may be obtained. The pigment, when ground into a powder in a size range from about 2 to about 20 microns in diameter with an average diameter of about 5 microns, is incorporated into a molding grade low density polyethylene in an amount approximately 1 to 2% by weight. The molded article made therefrom in a reciprocating screw injection molding machine exhibits uniformly distributed nondegraded color at melt temperatures up to and including 600° F which is not possible with prior art compositions.

EXAMPLE 22

Equimolar quantities of benzoic acid (B), isophorone diamine (N), and adipic acid (A) slurried in water are reacted to form a modified polyamide co-condensation product. It is preferred to start with water, isophorone diamine and benzoic acid in the reaction vessel, the contents of which are raised to 210° C before adipic acid is added. The reaction mass is then heated to 260° C with constant stirring until the reaction is complete. A very fluid resinous mass is obtained to which a fluorescent yellow dye is added. The reaction mass is dumped and cooled. A pigment is obtained which is relatively low melting, but which when ground in a quartz dish at dry ice temperature yields a friable finely divided pigment.

EXAMPLE 23

0.8 mol zinc oxide is added to 1 mol of isophorone diamine (N) and 2 mols of cyclohexylamine (C). The mixture is blended until smooth and sufficient water, about 1.5 mols water, is added to it for better fluidity. The mixture is stirred and warmed and 2 mols of isophthalic acid (I) and 1 mol of adipic acid (A) are mixed in with constant stirring. The reaction mass is heated to 270° C and maintained at that temperature for 20 minutes to ensure all water being driven from the reaction mass. The components in the reaction product are present in the ratio N:I:C:A:Zn = 1:2:2:1: 0.8. The reaction mass is then cooled to 240° C and a mixture of Rhodamine BX in an amount about 1.73% by weight of the reaction mass and Rhodamine 6GDNX about 0.43% by weight are added thereto. A fluid mixture is obtained which, when dumped, cools into a nonporous highly friable mass. The pigment formed may be blended either into low density polyethylene, polypropylene or into a vinyl plastisol.

EXAMPLE 24

In a procedure analogous to that of the preceding example, 0.8 mol zinc oxide is added to a mol of isophorone diamine (N) and a mol of cyclohexylamine (C) with sufficient water to form a fluid mass. One mol of isophthalic acid (I) is then stirred into the reaction mass and the temperature rises due to the exothermic reaction. The reaction mass is cooled to about 65° C and another mol of cyclohexylamine (C) is added thereto, smoothly blended therein, and thereafter an additional 2 mols of isophthalic acid (I) are also added. The reaction mass is slowly heated to a temperature of 270°–275° C and maintained for about 20 minutes. The reaction mass proceeds through a phase of high viscosity at a temperature between 120° C and 170° C after which it becomes progressively more fluid. The componenets in the reaction product are present in the ratio N:C:I:Zn = 1:2:3:0.8. After all water is driven from the reaction mass, it is cooled to a temperature of 255° C and Rhodamine BX in an amount about 1.2% by weight and Rhodamine 6GDNX in an amount about 1.3% by weight of the reaction mass are added to the resin before it is dumped and cooled. It forms a highly friable nonporous mass in excellent yields in excess of 90% of theoretical. The pigments exhibit little or no bleed when used in polyvinyl chloride based goods.

EXAMPLE 25

As in the prior example, an analogous procedure is used wherein sufficient water is provided to form a smooth mixture with 3 mols of isophorone diamine (N) and 1 mol of cyclohexylamine (C) at 30° C. Two mols of isophthalic acid (I) are stirred into the mixture and the temperature rises due to the exothermic heat of reaction. An additional 2 mols of isophthalic acid (I) are added with constant stirring at a temperature of about 90° C. The temperature is raised and mixing is continued. The reaction mass becomes extremely viscous at a temperature in the range from 140° C to 160° C but progressively gets more fluid as the temperature is increased. Heating is continued while water of reaction is liberated and the reaction mass is held at a temperature of about 285° C for about 10 minutes until all water is driven off. The components in the reaction product are present in the ratio N:C:I = 3:1:4. Rhodamine BX in an amount of about 1.2% by weight and Rhodamine 6GDNX in an amount of about b 1.3% by weight are added to the molten reaction mass and stirred until homogeneously dispersed. The reaction mass is dumped at about 282° C and cooled. The pigment is obtained in excellent yields in excess of 90%, and forms a non-porous, highly friable mass which is highly compatible with plastisols. There is essentially no discernible bleed from extruded polyvinyl chloride sheet or polyvinyl chloride plastisol goods.

EXAMPLE 26

As in the previous example, sufficient water is added to form a fluid mass of 1 mol of isophorone diamine (N) and 1 mol of cyclohexylamine (C) to which 0.6 mol of zinc oxide is added. The mixture is stirred for 5 minutes until smooth and 1.5 mols isophthalic acid (I) added, when the temperature rises to about 80° C due to the exothermic heat of reaction. An additional mol of cyclohexylamine (C) and 1.5 mols of isophthalic acid (I) are added homogeneously dispersed into the reaction mix while constantly stirred. The mixture is difficult to stir and very viscous in the range from 130° C to 190° C after which it progressively gets less viscous. The mixture is then heated further to a temperature of about 275° C and maintained at that temperature for about 20 minutes. The reaction product formed has component present in the ratio N:C:I:Zn = 1:2:3:0.6. The reaction mass is cooled to 250° C and Rhodamine BX in an amount of 1.2% by weight and Rhodamine 6GDNX in an amount of 1.3% by weight are added to the reaction mass and homogeneously blended therein. The reaction mass is dumped at 250° C and cooled whereupon it forms a nonporous, highly friable mass which is ground into a finely divided pigment. The pigment is useful both in moldable polyolefine powders as well as in polyvinyl plastisol dispersions.

EXAMPLE 27

As in the previous example, 2 mols of isophorone diamine (N) and 1 mol of cyclohexylamine (C) are mixed with sufficient water to give fluidity and 1 mol of isophthalic acid (I) is mixed therein. The exothermic heat of reaction gives a temperature increase to approximately 75° C whereupon an additional 2 mols of isophthalic acid (I) are added to the mixture while stirring. The temperature continues to rise and is stirred to maintain a homogeneous reaction mass while water of reaction is evolving. The reaction product formed has components present in the ratio N:C:I: = 2:1:3. The reaction mass is held at a temperature of about 280° C for 5 minutes thereupon cooled to a temperature in the range of 260° C to 265° C and 1.3% by weight of fluroescent yellow dye is homogeneously blended therein. The mass is thereupon dumped and yields a nonporous extremely friable bright yellow pigment on cooling. As in other instances in the temperature range from about 130° C to 190° C, the resinous mass exhibits high viscosity, but at higher temperatures the viscosity decreases markedly.

EXAMPLE 28

Unit molar quantities of trimethyl-hexamethylene diamine (TMD), benzoic acid (B) are heated to 210° C with a sufficient quantity of water to maintain a fluid mixture. The mixture becomes clear at about 210° C and remains clear at 210° C. One mol of isophthalic acid is homogeneously mixed into the mixture which is then heated to 260° C and maintained at that temperature unitl all water of reaction is evolved. The reaction mixture is cooled to 210° C and a dye, Yukon 3G, in an amount of about 4% by weight of the mixture is homogeneously mixed into it. The reaction mixture is dumped and cooled whereupon a relatively low melting pigment is formed which is nonporous and friable when ground at low temperatures, preferably in a dry-ice-jacketed grinder. The pigment formed has a resin composition in which the ratio of trimethylhexamethylene diamine (TMD), benzoic acid (B) and isophthalic acid (I) is in the ratio of 1:1:1.

EXAMPLE 29

The same procedure as in Example 28 is followed utilizing equimolar quantities of trimethyl-hexamethylene diamine (TMD), benzoic acid (B) and isophthalic acid (I), but includes the addition of 0.5 mol of calcium hydroxide, the ratios in the mixture being TMD:B:I:Ca = 1:1:1:0.5. A relatively low melting resinous cocondensate is formed which is useful where high heat stability is not important.

EXAMPLE 30

Sufficient water is added to form a fluid mass with 1 mol of isophorone diamine (N) and 1 mol of cyclohexylamine (C) to which 0.25 mol of zinc oxide is added. The mixture is stirred for five minutes until smooth and a mol of isophthalic acid (I) is added; the temperature rises from about 80° C to 85° C due to exothermic heat of reaction. Stirring is continued until the mixture is smooth and thereafter an additional mol of isophthalic acid is added while stirring constantly. The temperature is then raised gradually to about 275° C and maintained at that temperature for about 20 minutes. The reaction product formed has components present in the ratio of N:C:I:Zn = 1:1:2:0.25, representing a 50 mol percent of theoretically combinable zinc metal in the reaction product. The softening point of the product is in the range from about 195° C to 202° C. The reaction mass is cooled to 250° C and Rhodamine BX in an amount of 1.2by weight and Rhodamine 6GDNX in an amount of 1.3 percent by weight are added to the reaction mass and homogeneously blended therein. The reaction mass is dumped at 250° C and cooled whereupon it forms a nonporous, highly friable mass which is ground into a finely divided pigment. The pigment is useful both in moldable polyolefin powders as well as in polyvinyl plastisol dispersions. A clamp test at a temperature of 75° C for 1 hour clamp shows only a trace of a bleed. Room temperature bleed under clamping pressure of 22 psi shows only a trace of a bleed after two weeks.

EXAMPLE 31

30 cc of water is added to form a fluid mass with 68.12 g of isophorone diamine (N) and 49.59 g of cyclohexylamine (C) to which 12.2 g of zinc oxide is added. The mixture is stirred for 5 minutes until smooth and 66.45 g of isophthalic acid (I) is added; the temperature rises from about 80° C to 85° C due to exothermic heat of reaction. Stirring is continued until the mixture is smooth and thereafter an additional 83.07 g of isophthalic acid is added while stirring constantly. The temperature is then raised gradually to about 275° C and maintained at that temperature for about 20 minutes. The reaction product formed has components present in the ratio N:C:I:Zn = 1:1.25:2.25:0.375, representing 60 mol percent of theoretically combinable zinc metal in the reaction product. The softening point of the product is in the range from about 194° C to 199° C. The reaction mass is cooled to 250° C and 2.7 g of Rhodamine BX and 2.93 g of Rhodamine 6GDNX are added to the reaction mass and homogeneously blended therein. The reaction mass is dumped at 250° C and cooled whereupon it forms a nonporous, highly friable mass which is ground into a finely divided pigment. The pigment is useful both in moldable polyolefin powders as well as in polyvinyl plastisol dispersions. A clamp test at a temperature of 75° C for 1 hour clamp shows only a trace of a bleed. Room temperature bleed under clamping pressure of 22 psi shows only a trace of a bleed after one week.

EXAMPLE 32

To a mixture of 51.09 g isophorone diamine (N), 59.5 g cyclohexylamine (C) and 30 ml water is added 19.53 g zinc oxide. The mixture is stirred to form a smooth dispersion. 99.68 g isophthalic acid (I) and 39.63 g glutaric acid (G) are gradually heated while continuously stirred. The temperature is raised to 104° C and heating is continued until the reaction mass reaches about 275° C at which temperature it is held for about 20 minutes. The reaction product formed has components present in the ratio N:C:I:G:Zn = 1:2:2:1:0.8. The reaction mass is cooled to 258° C and 3.68 g Rhodamine BX and 0.913 g Rhodamine 6 GDNX are added. The mixture is stirred for about 6 minutes to ensure homogeneous dispersion of the dyes and is dumped at 245° C. The material is easily ground to a Hegman grind of 4.5.

In a manner similar to that described immediately hereinabove, a pigment is formed in which succinic acid is used instead of glutaric acid to form a pigment in which the components present are in the same molar ratio, namely 1:2:2:1:0.8.

Both pigments are nonporous and highly friable. They are easily incorporated into moldable polyolefin powders and polyvinyl plastisol dispersions. Clamp tests both at room temperature and an elevated temperature of about 75° C show only a trace of a bleed.

EXAMPLE 33

To a mixture of 5.16 g diethylene triamine (0.05 mol), 9.92 g cyclohexylamine (0.10 mol), 0.81 g ZnO (0.01 mol), and 6.0 cc water were added 12.46 g isophthalic anhydride. A fairly smooth paste was formed on stirring and the temperature rose to 90° C. When the temperature fell spontaneously to 80° C, and additional 12.46 g isophthalic anhydride were added with stirring to give a total of 24.92 g isophthalic anhydride in the mixture. The temperature remained in the range of 75°–80° C during the addition. The mixture was then heated to 270° C and held at 265°C to 270°C until evolution of $H_2O$ stopped. The mixture was found to be readily stirrable from 80° C to 270° C.

The mixture was then cooled to 240° C and 0.57 g of Rhodamine BX and 0.14 g of Rhodamine 6 GDNX were added. The mixture including the dyes was stirred at 230° C to 240° C for 6 minutes and dumped at 235° C. On cooling, a brittle transparent colored resin was obtained. Fluorescent color was fair and the pigmentary material obtained on pulverizing was bluer and "dirtier" (as relates to pigments) in polyethylene at 1% concentration than the product produced in accordance with Example 41. Yield 31.5 g. Loss during reaction amounted to 4.68 g.

Powdered product (ground in mortar) agglomerated in water within a few minutes with stirring. It was not apparently soluble in water but showed some color bleed into the aqueous phase. The yield was 5.3 g below theoretical, probably because the cyclohexylamine is the most volatile of the reactants and it was likely that about one-half of it was lost in the preparation due to volatilization during the reaction. The mol ratio was presumed to be 1:1:3:0.2.

The color in molded polyethylene was much bluer and dirtier than the pigment of Example 41 in polyethylene at the same concentration, i.e. 1% by weight.

EXAMPLE 34

35.0 cc of water, 76.64 g isophorone diamine (0.45 mol), 44.63 g cyclohexylamine (0.45 mol), and 7.32 g ZnO (0.09 mol) were added to a breaker and stirred 5 minutes. 74.76 g of terephthalic acid (0.45 mol) was added with stirring and the temperature rose to 90° C. The mixture formed into a soft solid. An additional 74.76 g of terephthalic acid (0.45 mol) were added and mixed in with a spatula. The temperature was increased to 285° C. The mixture was solid from 90° C to 225° C where appreciable melting began. A propeller-type stirrer was on from 160° C.

The mixture was held at 275° C to 285° C for 10 minutes. Most of the water of reaction evolved between 240° C and 280° C. A reaction loss of 25.94 g was noted. The mixture was cooled to 268° C and 3.96 g of Rhodamine BX and 0.99 g Rhodamine 6GDNX were added with stirring with the temperature going to 265° C. The mass was stirred 6 minutes at 265° C to 260° C and dumped. It was very viscous at 260° C. The yield was 228.2 g.

A brittle opaque resin with poor to fair fluorescent color was obtained. The color was considerably darker than Example 41 in a crush-out on paper. At 1% by weight in molded polyethylene, it was bluer and dirtier than Example 41.

The fact that some pigments are dirtier than others does not detract from their utility, e.g. in plastic toys or novelties.

EXAMPLE 35

14.45 g of cadmium oxide (0.1125 mol) were added to a mixture of 76.64 g isophorone diamine (0.45 mol), 44.63 g cyclohexylamine (0.45 mol) in 30 ml water with moderate stirring. 74.76 g isophthalic acid were added to the mixture with rapid stirring and the temperature rose to 90° C. The mass was allowed to cool to 80° C and the last half of the isophthalic acid (74.76 g) added to bring the total isophthalic acid to 149.52 (0.90 mol). The temperature again rose to approximately 90° C. The mixture was then heated to 276° C with stirring. In the temperature range of 120° C to 180° C the mass was very viscous and barely stirrable. The temperature of the mass was held at 270° C–275° C with stirring for 15 to 20 minutes until water evolution ceased. A reaction loss of 26.35 g was noted. The yield was 239 g.

The reaction mass was allowed to cool to 258° C and 3.96 g of Rhodamine BX and 0.99 g of Rhodamine 6 GDNX were added with stirring and the temperature dropped to 252° C. The temperature was held at 248° C to 252° C with stirring for 6–7 minutes to dissolve the dyes. The mass was dumped at 251° C. On cooling there was obtained a brittle resin having good fluorescent color.

Before addition of the dyes, a small portion of resin was cooled. The color was very slight greenish yellow (transparent) in comparison to undyed resin made with ZnO (transparent yellow). A few very small pinpoint specks of unreacted CdO were visible in the sample of resin which was then returned to the melt after examination. The resin has a softening point of 187° C.

The dyes product has a color and brightness very close to that of Example 41 in crush-out on paper. The heat stability at 600° F is very satisfactory and about equal to that of Example 41.

EXAMPLE 36

166.13 g of isophthalic acid (1.0 mol) were added to a mixture of 30.0 cc water, 30.30 g of ethylene diamine (95.9%) (0.50 mol), 49.5 g of cyclohexylamine (0.50 mol) and 10.17 g of ZnO over 1 to 2 minutes with stirring. The temperature rose to 110° and foamed to a depth of 2 to 3 inches in a stainless steel beaker. Rapid stirring cause the foam to subside quickly. The acid could be added in two portions such as Example 35.

The reaction mass was heated with stirring to 275° C and held at 270° – 275° C with stirring approximately 10 minutes until H$_2$O evolution ceased. A reaction loss of 29.27 g was noted. The mix was readily stirrable from 110° C (thick paste) to 275° C. It started to become viscous at about 170° C to 180° C. The melt was cooled to 238° C and 3.43 g of Rhodamine BX and 0.85 g of Rhodamine 6GDNX were added, stirred 6 –7 minutes at 234° C to 240° C, and then dumped.

209.3 g of a transparent brittle resin were obtained on cooling having excellent fluorescent color. It was readily ground in a mortar and had a softening point of 151° C. The product is insoluble in water, slightly agglomerated, and showed very slight bleed in water. It is insoluble in acetone with slight bleed. It is slightly soluble in ethanol with severe bleed. It is soluble in dimethyl formamide (DMF).

This pigment has excellent fluorescent color at a concentration of 1% by weight in low density polyethylene. Color was better than in Example 41, but light stability not as good as in Example 41. There was considerably more initial darkening. The product was, however useful for coloring polyethylene where light stability was not a primary consideration.

EXAMPLE 37

Following the same procedure as given in Example 30, the following ingredients were utilized in the amounts indicated:

| | | |
|---|---|---|
| Water | 22.0 ml | |
| Isophorone diamine | 55.95 g | (.3285 mol) |
| Isophthalic acid | 109.15 g | (.6570 mol) |
| Cyclohexylamine | 32.58 g | (.3285 mol) |
| Zinc oxide | 6.68 g | (0.0821 mol) |
| Rhodamine BX | 88.05 g | |
| Reaction loss | 19.22 g | (1.0676 mol) |
| Actual yield | 254.2 g | |
| Melting point | 175°C | |

The amount of dye was 35% by weight on the basis of 163.52 g of resin to form a concentrate.

EXAMPLE 38

Following the same procedure as set forth in Example 30, the following ingredients were utilized:

| | | |
|---|---|---|
| Water | 30.0 ml | |
| Isophorone diamine | 76.64 g | (0.45 mol) |
| Cyclohexylamine | 44.63 g | (0.45 mol) |
| Isophthalic acid | 149.52 g | (0.90 mol) |
| Rhodamine BX | 3.96 g | (1.73% on basis on 224 g) |
| Rhodamine 6GDNX | 0.98 g | (0.43% on 224 g) |

The same procedure as used in Example 30 was utilized with the exception that the full amounts of all ingredients with the exception of the colors was put in at the beginning of the reaction and no problems in forming the resin are encountered. This material showed poor heat stability at 600° F in high density polyethylene at a 1% concentration level. The color became purplish at temperatures of from 450° F to 600° F.

The inclusion of 0.041% zinc oxide dry-blended with a 1% concentration of the pigment of this example with polyethylene showed an improved heat stability but only fair when compared to the product of Example 41.

The addition of 0.082% of zinc oxide dry blended into a 1% high density polyethylene blend of the pigment of this example showed better improvement in the heat stability and equalled that of the pigment of Example 41. It should be noted that in Example 41 the amount of zinc oxide used is actually 3.8%. The FIG. 0.041% zinc oxide (based on a polyethylene-pigment blend) was used instead of 0.038% zinc oxide in order to allow for some loss of zinc oxide during mixing. In Example 41 the zinc oxide is not present as ZnO but as a zinc compound of the resin after reaction with the free

EXAMPLE 39

The following ingredients were reacted following generally the same procedure as set forth in the previous examples with the exceptions noted below:

| | | |
|---|---|---|
| Water | 30. ml | |
| Isophorone diamine | 102.18 g | (.60 mol) |
| Cyclohexylamine | 29.8 g | (.30 mol) |
| Isophthalic acid | 149.52 g | (.90 mol) |
| Reaction loss | 27.02 g | |
| Cyan blue GTNF | 3.97 g | (1.65% on 234 g) |
| TiO$_2$ | 2.44 g | |
| MDAC | 2.40 g | |

The actual yield was 244.2 g.

The water, cyclohexylamine and one-half the isophorone diamine were put in a beaker. The Cyan blue and opacifier TiO$_2$ were added and stirred for five minutes. Thereafter one-third of the isophthalic acid was added and stirred for ten minutes and then the rest of the isophthalic acid added. The mass was heated to 195° C and the balance of the isophorone diamine added slowly. The mass was heated to 270° –275° C for 10 minutes. The mass was cooled to 260° C and the MDAC added. The temperature fell to 255° C, the mixture was stirred for 5 minutes and dumped.

EXAMPLE 40

74.06 g phthalic anhydride (0.5 mol) were added to 85.15 g of isophorone diamine (0.5 mol) and the mixture heated to 220° C with stirring. At approximately 100° C an exothermic reaction commenced. The temperature rose to 165° C in 15 –20 seconds and was accompanied by a great increase in viscosity. Rapid foaming occurred with water evolution which ceased at a temperature of about 220° C. 8.14 g of zinc oxide (0.1 mol) were added and stirred for 2 minutes, and 83.07 g of isophthalic acid (0.5 mol) were added at 225° C. The temperature fell to 205° C and was increased to 265° C with stirring. It was held at 260° –267° C for 15 minutes. The mix was then cooled to 250° C and 13.17 g of stearic acid added. 3.87 g of Rhodamine Bx, 0.96 g of Rhodamine 6GDNX were added at 234° C. 26.33 g of Ultrathene 635[1] were added at 232° C to 236° C and stirred for 10 minutes and then dumped. There was a reaction loss of 18.02 g. The color and brightness of the resulting pigment were close to Example 38. In molded polyethylene at 1% concentration, the color of this material was bluer and somewhat duller than the pigment of Example 38. The light stability of the material was less than that of Example 38.

[1]See Example 21 for description of Ultrathene

This product is different from the others herein exemplified It shows the adaptability of the overall process to the production of a different class of materials wherein the reaction product of an aromatic dicarboxylic acid or anhydride having the C's of the carboxyl groups on contiguous aromatic ring carbon atoms and a polyamine form an imide-amide type compound. The phthalic anhydride appears to be acting as a monofunctional compound by forming an imide with one amino group of the polyamine.

EXAMPLE 41

Following the same procedure as in Example 30, the following ingredients were reacted:

| | | |
|---|---|---|
| Water | 30 ml | |
| Isophorone diamine | 76.64 g | (0.45 mol) |
| Cyclohexylamine | 44.63 g | (0.45 mol) |
| Isophthalic acid | 149.52 g | (0.9 mol) |
| Zinc oxide | 9.15 g | (0.1125 mol) |
| Reaction loss | 26.35 g | |
| Rhodamine BX | 3.96 g | |
| Rhodamine 6GDNX | 0.98 g | |
| Actual yield | 235.10 g | |

This material is ground to a 4 –5.0 Hegman grind and provides a standard of satisfactory color and heat stability in accordance with the present invention.

It may be preferred to add the acid in two parts as in Example 35.

EXAMPLE 42

61.06 g of benzoic acid were added to a mixture of 85.15 g of isophorone diamine and 9 ml of water. This mass was heated to 205° C with stirring. 8.14 g of zinc oxide were added to the reaction mass and stirring continued for 3 minutes. 83.07 g of isophthalic acid were added at 210° – 215° C and melt heated to 265° C with stirring. The temperature was held at 260° – 265° C for 15 minutes to 255° C. 11.52 g of stearic acid were added slowly at 255° C and the temperature fell to 240° C. 11.525 g of Ultrathene 635 (see Example 21) were added along with the dyes Rhodamine BX 3.39 g and Rhodamine 6GDNX 0.84 g. The temperature was 235° C. The balance of the Ultrathene 11.525 g were added at 234° – 237° C and the mixture stirred for 5 minutes. The mass was dumped at 237° C, cooled and crushed to a 5.0 Hegman grind. When molded at 400° C in a polyethylene dispersion, good color was obtained.

In the foregoing examples, a brittle resins material is obtained and is easily ground by conventional grinding means to convenient sizes for dispersion in various plastic compositions. For most purposes, the pigment particles may have a particle size in the range of from 1 to 30 microns, this being a distribution range, with the bulk of the material being in the range of from 2 to about 20 microns. Very large particle sizes are also useful in the formation of concentrates.

What is claimed is:

1. A particulate dyed thermoplastic friable substantially linear modified polyamide having at least one free carboxy group and formed by reacting in the liquid state.
   a. a polyfunctional amine selected from the group consisting of 1-amino-3-aminomethyl-3,5,5-trimethyl cyclohexane, meta-xylylene diamine, para-xylylene diamine, ethylene diamine, diethylene triamine, triethylene tetramine, dimethylamino propylamine, diethylamino propylamine, trimethyl-hexamethylene diamine, and 1,3-di-4-piperidylpropane,
   b. a monocarboxylic compound selected from
      1. an aromatic monocarboxylic acid selected from benzoic acid, p-toluic acid, o-toluic acid and 4-methoxy benzoic acid,
      2. the monocarboxy-containing condensation product of (I) an alkyl primary monoamine selected from cycloalkyl primary monoamines, heterocyclic secondary monoamines, and benzylamine with an equimolar amount of (II) a dicarboxylic acid selected from isophthalic acid, terephthalic acid, dicarboxy naphthalene, and aliphatic dicarboxylic acids having less than 10 carbon atoms serially linked in a chain; and c. a polycarboxylic acid selected from isophthalic acid, terephthalic acid, trimesic acid, dicarboxy naphthaene, tricarboxy naphthalene, pyromellitic acid and aliphatic dicarboxylic acids having less than 10 carbon atoms serially linked in a chain in a molar ratio of a:b:c ranging from 10:1:10 to 1:1:1, said polyamide having a molecular weight in the range of from about 400 to 2500, said polyamide also containing a coloring dye.

2. The composition of claim 1 including coloring material to form a pigment, the amount of coloring material being in the range of from about 0.01% to 35% by weight of the resin.

3. The composition of claim 1 wherein said coloring material is at least one daylight dye in an amount effective for daylight fluorescence.

4. The composition of claim 1 including a heat stabilizer compatible with said pigment in an amount sufficient to react with at least 30% of the free COOH groups in the polyamide.

5. The composition of claim 4 wherein said stabilizer is selected from organic acid salts of elements of Groups IIA and IIB and inorganic compounds of said groups.

6. The composition of claim 5 wherein said inorganic compounds are selected from the oxides and carbonates.

7. The composition of claim 5 wherein the inorganic compounds are zinc and magnesium compounds.

8. The composition of claim 1 including an opacifier in an amount up to 20% by weight of the pigmentary material.

9. A process for making a pigment which comprises forming a thermoplastic friable substantially linear modified polyamide having at least one free carboxy group and comprising the steps of:

a. reacting a polyfunctional amine selected from the group consisting of 1-amino-3-amenomethyl-3,5,5-trimethyl cyclohexane, meta-xylylene diamine, paraxylylene diamine, ethylene diamine, diethylene triamine, triethylene tetramine, dimethylamino propylamine, diethylamino propylamine, trimethyl-hexamethylene diamine, and 1,3-di-4-piperidylpropane with a monocarboxylic compound selected from 1. an aromatic monocarboxylic acid selected from benzoic acid, p-toluic acid, o-toluic acid, and 4-methoxy benzoic acid,
2. the the monocarboxy-containing condensation product of (I) an alkyl primary monoamine selected from cycloalkyl primary monoamines, heterocyclic secondary monoamines, and benzylamine with an equimolar amount of (II) a dicarboxylic acid selected from isophthalic acid terephthalic acid, dicarboxy naphthalene, and aliphatic dicarboxylic acids having less than 10 carbon atoms serially linked in a chain in a molar ratio of said polyamine to said monocarboxylic compound in the range of from about 1:1 to 9:1;

b. thereafter adding to the reaction mass a polycarboxylic acid selected from isophthalic acid, terephthalic acid, trimesic acid, dicarboxy naphthalene, tricarboxy naphthalene, pyromellitic acid and aliphatic dicarboxylic acids having less than 10 carbon atoms serially linked in a chain;

c. raising the temperature to about 265° C so as to maintain the reaction mass in the liquid state during the reaction;

d. incorporating a coloring dye; and e. reducing the resultant colored polyamide product to particulate form.

10. The process of claim 9 wherein succeeding step (c) an additional step is provided comprising d. dispersing a stabilizing quantity of a stabilizer compatible with said pigment, said stabilizer being selected from the organic acid salts of elements of Groups IIA and IIB and the oxides and carbonates of said elements wherein said oxides and carbonates are present in sufficient amount to coact with at least onethird of the aggregate number of carboxyl groups in the resin mass.

11. The process of claim 9 wherein the coloring material added is a fluorescent dye.

12. The process of claim 9 which is additionally characterized by the step of dispersing a stabilizing quantity of a stabilizer selected from the organic acid salts of elements of Groups IIA and IIB, the oxides of such elements, and the carbonates of such elements in the reaction mass.

* * * * *

UNITED STATES PATENT OFFICE
CERTIFICATE OF CORRECTION

PATENT NO. : 3,915,884
DATED : October 28, 1975
INVENTOR(S) : Zenon Kazenas

It is certified that error appears in the above-identified patent and that said Letters Patent are hereby corrected as shown below:

Column 2, line 3, "it" should read --It--.

Column 6, line 53, after the word "triethylene", insert --tetramine,--.

Column 7, line 40, before the word "about", insert --from--.

Column 8, line 2, after the word "molding", insert --machine--.

Column 8, line 34, the word "in" should read --is--.

Column 10, line 61, after "55°C", insert --with--.

Column 11, line 64, "EX" should read --BX--.
Column 15, line 12, after "1.2", insert --percent--.
Column 17, line 49, "dyes" should read --dyed--.

Column 17, line 49, "has" should read --had--.

Column 19, line 4, after the word "free", insert --carboxyl groups--.

Signed and Sealed this second Day of March 1976

[SEAL]

Attest:

RUTH C. MASON
Attesting Officer

C. MARSHALL DANN
Commissioner of Patents and Trademarks